T. F. ROWLAND.
MACHINE FOR CHARGING GAS RETORTS.
No. 7,591. Reissued April 3, 1877.
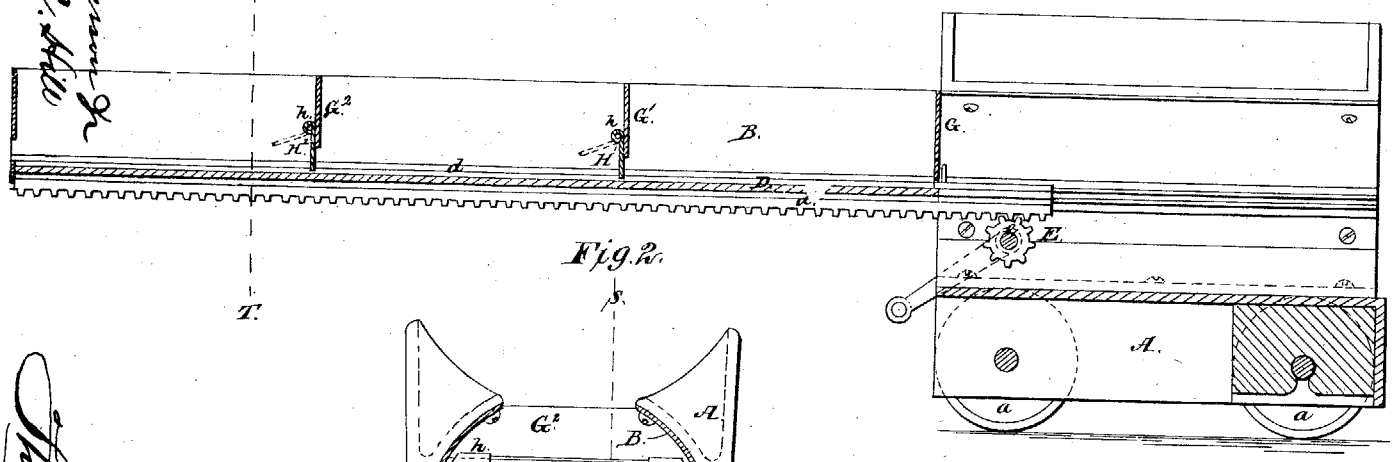
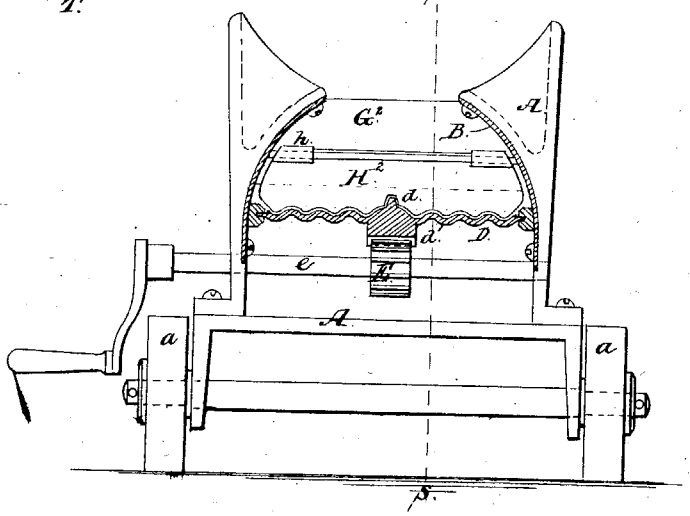
Witnesses:
E. N. Dickerson Jr
Warren E. Hill
Inventor:
Thos. F. Rowland

UNITED STATES PATENT OFFICE

THOMAS F. ROWLAND, OF GREEN POINT, BROOKLYN, NEW YORK.

IMPROVEMENT IN MACHINES FOR CHARGING GAS-RETORTS.

Specification forming part of Letters Patent No. 131,564, dated September 24, 1872; reissue No. 7,591, dated April 3, 1877; application filed December 18, 1876.

*To all whom it may concern:*

Be it known that I, THOMAS F. ROWLAND, of Green Point, Brooklyn, Kings county, New York, have invented a certain Improvement relating to Machines for Charging Gas-Retorts, of which the following is a specification:

The revolving scoops in common use, whether working by hand or by machinery, are illy adapted to charge the flat-bottomed retorts, commonly called D-retorts, in general use in this country. One of the cylindrical retorts of Europe can be filled to a proper height by the inversion of a semi-cylindrical scoop of a little less diameter; but several repetitions with scoops of small diameter are required by properly charging a D-retort, and the time involved is an important element for many reasons, not the least of which is the long exposure of the retort to the cooling action of the atmosphere. I employ a scoop which is not reversible, and is of a shape to correspond approximately with the interior of D-shaped retort. It is permanently open at the top, and receives the charge through such opening when withdrawn. It is emptied by the removal of the bottom, in conjunction with peculiar means for retaining the coal in the retort until the withdrawal of the scoop, and for liberating it as the scoop is withdrawn.

Additional details of the invention will appear in the following full description of what I consider the best means of carrying out the invention.

The accompanying drawing forms a part of this specification.

Figure 1 is a vertical section of the line S S in Fig. 2, showing the scoop ready to have its bottom withdrawn to deposit the coal in a retort not represented. Fig. 2 is a cross-section on the line T T in Fig. 1, with an elevation of the carriage, as will be understood.

Similar letters of reference indicate like parts in both figures.

A is a substantial carriage mounted on wheels *a a*, and B is a scoop fixed rigidly to the carriage, and of a proper length and size to enter and nearly fill the entire interior of a D-retort. It will be understood that the same carriage A may have six, or any other number, of the scoops B properly arranged to correspond with the retorts which are to be charged; and that the carriage may be provided with mechanism for sliding the bottoms of all the scoops simultaneously. I have represented but one, and a description of that, with its adjuncts, will suffice for any number. D is a corrugated cast-iron bottom, sliding in grooves provided in the interior of each side of the scoop B. The corrugations extend longitudinally of the bottom; and, excepting these wavy lines and a slight strengthening-rib, *d*, along the middle, the entire upper surface is made smooth. The lower side is formed with a stout rack, *d'*, which receives the teeth of a corresponding gear-wheel, E, mounted on a shaft *e*, supported in bearings in the carriage A, and provided with suitable means for turning it with proper force when required. A fixed transverse partition, G, is constructed across the scoop B, with its lower edge waved to match pretty closely to the corrugated bottom D. Other partitions, $G^1$ $G^2$, are mounted at intervals across the scoop; but their lower edges are much higher. These partitions brace and stiffen the scoop B; and also, in conjunction with the flap-valves $H^1$ $H^2$, perform another very important function. The flap-valves are mounted on hinges *h* near the base of the respective fixed partitions $G^1$ $G^2$; and when the coal is introduced from the charging-hopper, (not represented,) the flap-valves hang down in the position represented in strong lines in Fig. 1. These partitions and valves being thickly introduced keep the coal practically in separate compartments, and any required equality of the charge may be obtained by weighing or otherwise nicely graduating, the quantities supplied to each compartment.

To charge a retort, the cover or door of the retort having been removed, the carriage, with its scoop B properly filled with suitable coal, is run forward on a track, and the scoop is thereby thrust properly into the retort. Then the gear-wheel E being operated, the bottom D is run out, and the coal in the several compartments is allowed to drop and rest in the bottom of the retort. Meanwhile, until each compartment has been thus emptied, the valves $H^1$ $H^2$ perform the important function of preventing the coal from being drawn out with the bottom. The descent of the coal after the removal of the bottom brings the upper line of the coal about level with the lower edges of the fixed partitions $G^1$ $G^2$, &c. Next, by moving the carriage A backward on its track, the now bottomless scoop B is rapidly and easily withdrawn from the retort, the flap-valves $H^1$ $H^2$ readily turning in the position shown by the dotted lines in Fig. 1, to avoid the removal of the coal. The backward movement of the carriage on the track having been completed, the part D having been restored to proper relations with the scoop B, and the valves $H^1$ $H^2$ having again dropped by gravity, another charge of coal is introduced from above, and the apparatus is again ready for service.

It will be readily understood that the partition G, which descends quite to the bottom, should come just within the front of the retort. It will also be understood that the farther end of the scoop may have no valve, but the partition at that point should not come so low in any of these as to shake out or seriously disturb the coal.

Any irregularities in the surface of the coal as it is deposited in the retort may be evened or smoothed down by the lower edges of the partitions as the scoop is withdrawn.

I believe that the corrugating of the bottom, and the corresponding form of the lower edges of the partition G, and of the valves $H^1$ $H^2$, are important in practice, to give sufficient strength with reasonable weight; but some of the advantages of my invention may be realized with other forms for these parts.

I claim as my invention—

1. The scoop B, with suitable supporting-means A, and having a removable bottom, D, and valves $H^1$ $H^2$, combined and arranged for joint operation, substantially as herein specified.

2. The removable bottom D, corrugated longitudinally, in combination with the correspondingly-formed valves $H^1$ $H^2$, and curved sides B, adapted to match in a D-retort, and reciprocate separately therein, substantially as and for the purposes herein set forth.

3. The combination, with a stoking-machine in which the scoop enters the full length of the retort, and is co-extensive therewith, of one or more partitions or stops, the said apparatus so constructed being effective in preventing the withdrawal of the coal upon the withdrawal of its support, substantially as described.

4. A coal carrier or scoop, B, combined and arranged with one one or more swinging plates or partitions, $H^1$ $H^2$, which apparatus so constructed is effective in preventing the withdrawal of the coal upon the withdrawal of its support, while the scoop or carrier is easily withdrawn without withdrawing the coal, substantially as described.

5. The combination of a scoop or coal carrier with one or more fixed diaphragms, which apparatus is effective in leveling the surface of the coal by its withdrawal from the retort, substantially as described.

6. A D-shaped coal carrier or scoop having approximately the same length and shape as the D-shaped retort which it is intended to enter and fill, and adapted to carry and discharge the full amount of coal which the retort is capable of receiving, substantially as described.

7. The removable corrugated bottom D, as combined and connected with a coal carrier or scoop, B, substantially as described.

THOS. F. ROWLAND.

Witnesses:
E. N. DICKERSON, JR.,
WARREN E. HILL.